(12) United States Patent
Grabbe et al.

(10) Patent No.: US 11,247,669 B2
(45) Date of Patent: Feb. 15, 2022

(54) METHOD AND SYSTEM FOR COLLISION AVOIDANCE IN ONE HAZARDOUS AREA OF A GOODS LOGISTICS FACILITY

(71) Applicant: Jungheinrich AG, Hamburg (DE)

(72) Inventors: Florian Grabbe, Hamburg (DE); Stefan Ahrens, Rellingen (DE); Sven-Ole Heise, Osterrönfeld (DE); Jan Kopelke, Hamburg (DE); Tony Altmann, Brokstedt (DE); Felix Riesenhuber, Kiel (DE)

(73) Assignee: Jungheinrich AG, Hamburg (DE)

( * ) Notice: Subject to any disclaimer, the term of this patent is extended or adjusted under 35 U.S.C. 154(b) by 398 days.

(21) Appl. No.: 16/292,548

(22) Filed: Mar. 5, 2019

(65) Prior Publication Data

US 2019/0270449 A1 Sep. 5, 2019

(30) Foreign Application Priority Data

Mar. 5, 2018 (DE) ...................... 10 2018 104 992.7

(51) Int. Cl.
*B60W 30/09* (2012.01)
*B60Q 9/00* (2006.01)
(Continued)

(52) U.S. Cl.
CPC ............... *B60W 30/09* (2013.01); *B60Q 9/00* (2013.01); *B66F 9/0755* (2013.01); *B66F 9/24* (2013.01);
(Continued)

(58) Field of Classification Search
CPC ............. B60W 30/09; B60W 2554/00; B60W 2720/10; G01S 5/0072; G01S 13/931;
(Continued)

(56) References Cited

U.S. PATENT DOCUMENTS 6,650,242 B2 * 11/2003 Clerk ...................... F16P 3/144
340/425.5
7,324,013 B2 * 1/2008 Esson ................... G01S 13/931
340/435

(Continued)

FOREIGN PATENT DOCUMENTS

| DE | 102006038856 A1 | 2/2008 |
| DE | 102008017129 A1 | 10/2009 |
| DE | 202013101369 U1 | 4/2013 |
| DE | 102016223638 A1 | 6/2017 |
| EP | 3035074 A1 | 6/2016 |

*Primary Examiner* — Frederick M Brushaber
(74) *Attorney, Agent, or Firm* — Rankin, Hill & Clark LLP

(57) ABSTRACT

A method and a system for collision avoidance in a hazardous area (4) of a logistics facility (2) that includes determining a first distance (14) between a stationary hazardous area monitoring apparatus (30) disposed inside the hazardous area, and a first sending and receiving apparatus (13) that disposed on an industrial truck (10, 11, 12) and connected to a control system of the industrial truck, and determining a second distance (24) between the stationary hazardous area monitoring apparatus and a second sending and receiving apparatus disposed on a movable object. A determination is made as to whether the first distance and the second distance are less than or equal to a predeterminable intervention area distance (6), and a collision avoidance action is carried out if both the first distance and the second distance are less than or equal to the predeterminable intervention area distance.

15 Claims, 3 Drawing Sheets

(51) Int. Cl.
*B66F 9/075* (2006.01)
*B66F 9/24* (2006.01)
*B66F 17/00* (2006.01)
*G01S 5/00* (2006.01)
*G01S 13/931* (2020.01)
*B65G 1/04* (2006.01)
*G05B 19/418* (2006.01)

(52) U.S. Cl.
CPC .......... *B66F 17/003* (2013.01); *G01S 5/0072* (2013.01); *G01S 13/931* (2013.01); *B60W 2554/00* (2020.02); *B60W 2720/10* (2013.01); *B60Y 2200/66* (2013.01)

(58) Field of Classification Search
CPC ........ B66F 9/0755; B66F 17/003; B66F 9/24; B60Q 9/00; B60Y 2200/66; G05B 19/4189; B65G 1/04
See application file for complete search history.

(56) References Cited

U.S. PATENT DOCUMENTS

| | | | | |
|---|---|---|---|---|
| 8,248,263 | B2* | 8/2012 | Shervey | B66F 17/003 340/686.1 |
| 8,314,686 | B2* | 11/2012 | Kirtley, Jr. | G08B 13/24 340/10.1 |
| 9,230,419 | B2* | 1/2016 | Beggs | G08B 21/18 |
| 9,365,155 | B2* | 6/2016 | Hathaway | B60Q 5/006 |
| 9,513,606 | B1* | 12/2016 | Larsen | B25J 9/1676 |
| 9,542,824 | B2* | 1/2017 | Beggs | B60Q 1/2673 |
| 9,617,134 | B2* | 4/2017 | Swift | B60Q 5/005 |
| 10,924,881 | B2* | 2/2021 | Berg | H04W 4/021 |
| 2007/0120672 | A1 | 5/2007 | Zuziak et al. | |
| 2011/0279261 | A1* | 11/2011 | Gauger | F16P 3/16 340/539.1 |
| 2016/0180713 | A1 | 6/2016 | Bernhardt et al. | |
| 2017/0154531 | A1 | 6/2017 | Funabashi | |

* cited by examiner

METHOD AND SYSTEM FOR COLLISION AVOIDANCE IN ONE HAZARDOUS AREA OF A GOODS LOGISTICS FACILITY

PRIORITY CLAIM

This application claims priority to DE 10 2018 104 992.7, filed Mar. 5, 2018, which is hereby incorporated by reference in its entirety.

BACKGROUND OF INVENTION

Field of Invention

The invention relates to a method of avoidance of collisions in a hazardous area of a logistics facility, and a system for avoidance of collisions in a hazardous area of a logistics facility.

Brief Description of Related Art

In the operation of industrial trucks, of the types employed in logistics facilities, it is important to minimize the risk of accidents and collisions. Often, conditions of constricted available space prevail in such logistics facilities, e.g. warehouses or spaces of industrial facilities. Hazardous areas, in which collisions between industrial trucks and persons or other industrial trucks are elevated, include, e.g., intersections and building exits where visibility is limited.

Against this background, it is expedient to employ collision avoidance systems which indicate to people and to other industrial trucks that an industrial truck is approaching. For this purpose, industrial trucks are often equipped with light signals or acoustic signals. However, due to ambient noise, acoustic signals may not be noticed. Light signals are not apt to be conspicuous unless the industrial truck is in the line of sight of the observer and is being watched by the observer, and they may be overlooked due to the presence of other light signals.

Another option is to employ speed limits for industrial trucks in hazardous areas. However, there is no assurance that the operator of an industrial truck will obey the speed limits. Moreover, in instances where operators of industrial trucks limit their speed in hazardous areas under circumstances where a collision risk is not in fact present, the productivity of the logistics facility is unnecessarily reduced.

The object of the present invention is to provide a system and a method for avoidance of collisions in a hazardous area of a logistics facility, which system and method achieve a high degree of safety without unnecessarily hindering the operation of the logistics facility.

BRIEF SUMMARY OF THE INVENTION

This object is achieved by a method for collision avoidance in a hazardous area of a logistics facility, wherein a first distance between a stationary hazardous area monitoring apparatus which is disposed within the hazardous area, and a first sending and receiving apparatus is determined, wherein a second distance between the hazardous area monitoring apparatus and a second sending and receiving apparatus is determined, wherein the first sending and receiving apparatus is disposed on an industrial truck and is connected to a control system of the industrial truck, and the second sending and receiving apparatus is disposed on a movable object, wherein the method and the system are further developed in that a determination is made as to whether the first distance and the second distance are less than or equal to a predeterminable intervention area distance, and a collision avoidance action is carried out if both the first distance and the second distance are less than or equal to the predeterminable intervention area distance.

Preferably the first distance is determined by measurement of the propagation delay of a signal between the hazardous area monitoring apparatus and the first sending and receiving apparatus, and/or the second distance is determined by measurement of the propagation delay of a signal between the hazardous area monitoring apparatus and the second sending and receiving apparatus. Alternatively or additionally, the first distance and/or the second distance is/are determined by measurement of a signal strength of a signal. Also alternatively or additionally, the first distance and/or the second distance can be determined by triangulation, wherein in particular the hazardous area monitoring apparatus may be comprised of a plurality of triangulation units which are disposed spatially at a distance from each other.

Further, preferably, a collision avoidance action comprises limitation of a speed of the industrial truck. Alternatively or additionally, a collision avoidance action comprises a warning, provided at the location of the industrial truck and/or at the location of the movable object and/or at the location of the hazardous area monitoring apparatus, which warning may comprise an optical, acoustic, and/or haptic warning. Alternatively or additionally, a collision avoidance action comprises an intervention in the control system of the industrial truck.

The intervention area distance is established by a circular intervention area or respectively a spherical intervention area (regarded in three dimensions) which is notionally constructed around the hazardous area monitoring apparatus. The intervention area is the area in which the method is operative, under the described conditions, to limit the speed of the industrial truck. Advantageously the hazardous area is completely interior to the intervention area, or essentially corresponds to the intervention area. The speed of the industrial truck is limited in the intervention area such that the risk of a collision between the industrial truck and the movable object is essentially eliminated. Preferably, this occurs without any action on the part of the operator of the industrial truck, whereby even if the operator overlooks or ignores the hazardous area the speed will be subjected to limitation. In this way, one increases safety in the hazardous areas of the logistics facility.

Further, it is advantageous with this method that, in the intervention area, the speed of the industrial truck is limited only if, in addition to the industrial truck, a movable object is also present in this intervention area, because only in this case there is a risk of collision between the industrial truck and the movable object in the hazardous area. In this way, one avoids unnecessary reduction of productivity in the logistics facility.

The term "movable object" in the context of the present application is understood to mean a person, an industrial truck, a passenger automobile, or a truck, who/which is present in the logistics facility.

Further, the term "movable object" is understood to mean a warning unit, e.g. a warning sign. If the warning sign, having the second sending and receiving apparatus associated with it, is disposed in the intervention area, then for any industrial truck being operated in the intervention area, a collision avoidance action is carried out, since the warning sign itself is already in the intervention area, as a movable object therein. In this way, e.g., one can establish an area in which temporarily the speed of industrial trucks is limited, e.g. in areas in which construction is being carried out.

The term "logistics facility" is understood to mean, e.g., a storage room or space, an industrial room or space, a workshop building or an integrated complex comprised of such rooms or spaces, along with the surrounding premises. The term "hazardous area" is understood to mean an area in a logistics facility, in which area an elevated risk of collision pertains between an industrial truck and a movable object. Examples of such hazardous areas are: intersections or building exits with difficult visibility conditions.

In contrast to other methods of collision avoidance, in which it is necessary to determine the specific positions of the industrial truck and the movable object, e.g. with respect to a coordinate system, the inventive method does not require such a position determination. Therefore it is unnecessary to employ positioning apparatuses to determine specific positions. Therefore the sending and receiving apparatuses associated with the industrial truck and the movable object may be substantially simpler, in particular comprising only an antenna. In contrast to other methods, which e.g. directly determine the distance between the industrial truck and the movable object by means of propagation delay measurements, with the inventive method one specifically reduces the risk of collision in hazardous areas. Thus, the inventive method provides an inexpensive means of avoiding collisions in a hazardous area.

In order to minimize the risk of collision in the hazardous area, advantageously every industrial truck and every person in the logistics facility is provided with a sending and receiving apparatus. If, e.g., a first industrial truck as well as a second industrial truck are present in the intervention area, the speed of the first industrial truck is subjected to limitation, since in addition to the first industrial truck a second movable object, namely the second industrial truck, is present in the intervention area. At the same time, the speed of the second industrial truck is also subjected to limitation, since in addition to the second industrial truck a second movable object, namely the first industrial truck, is present in the intervention area.

According to an embodiment, to determine the first distance, it is provided to send a signal from the first sending and receiving apparatus to the hazardous area monitoring apparatus, wherein then a signal is sent back to the first sending and receiving apparatus from the hazardous area monitoring apparatus. In this embodiment, the first distance is determined by measurement of the propagation delay from the first sending and receiving apparatus, or from the control system of the industrial truck, which control system is connected to the first sending and receiving apparatus of the industrial truck.

Alternatively, first a signal is sent from the hazardous area monitoring apparatus to the first sending and receiving apparatus, and then a signal is sent from the latter back to the hazardous area monitoring apparatus. According to this alternative embodiment, the first distance is determined by measurement of the propagation delay from the hazardous area monitoring apparatus. Analogously, the second distance is determined either from the hazardous area monitoring apparatus or from the second sending and receiving apparatus.

If the distances are determined by the sending and receiving apparatuses, or by the control system of the industrial truck, the first distance is communicated by signal transmission from the first sending and receiving apparatus to the hazardous area monitoring apparatus, and the second distance is communicated by signal transmission from the second sending and receiving apparatus to the hazardous area monitoring apparatus. Thus, the first distance and the second distance are communicated from the locations at which they were determined to a common location, namely that of the hazardous area monitoring apparatus.

In any event, it is preferable if both the first distance and the second distance are available at the location of the hazardous area monitoring apparatus.

In a first embodiment, the determination of whether the first distance and the second distance are less than or equal to the predeterminable intervention area distance is made by the control system of the industrial truck. In this embodiment, the value of the second distance, and, if the first distance has been determined by the hazardous area monitoring apparatus, then also the value of the first distance, is communicated from the hazardous area monitoring apparatus to the first sending and receiving apparatus. Then, if both the first distance and the second distance are less than or equal to the predeterminable intervention area distance, the control system limits the speed of the industrial truck, e.g. said control system acts upon a brake and or a drive means of the industrial truck. According to this embodiment, the control system comprises in particular a data processing device, e.g. a computer.

In an alternative embodiment, the determination is made directly by the hazardous area monitoring apparatus. The determination is namely determination of the first distance and determination of the second distance, as already defined. Then, if both the first distance and the second distance are less than or equal to the predeterminable intervention area distance, the hazardous area monitoring apparatus acts upon the control system of the industrial truck, via signal transmission employing the first sending and receiving apparatus, so as to limit the speed of the industrial truck. According to this embodiment, the control system of the industrial truck may have a relatively simple design, and the hazardous area monitoring apparatus may be designed in particular as a data processing device.

In none of the described embodiments of the inventive method does direct signal transmission occur between the first sending and receiving apparatus and the second sending and receiving apparatus.

Preferably, the industrial truck is decelerated to a predeterminable safe speed, if both the first distance and the second distance are less than or equal to the predeterminable intervention area distance, and a speed of the industrial truck is greater than the predeterminable safe speed. This is accomplished, in particular, by action upon the control system of the industrial truck.

In this way, advantageously, if the current speed of the industrial truck is greater than the safe speed, a safe speed can be specified for the intervention area and the industrial truck can be decelerated to this safe speed.

Preferably, the safe speed is greater than zero. In other words, in the described method the industrial truck is thus not decelerated to a stop. It is unnecessary to actually stop the industrial truck when applying timely deceleration to avoid a collision, and indeed such a stopping would lead to unnecessary reduction in the productivity of the logistics facility. Further, in the instance described, two industrial trucks brought to a stop in the intervention area, by the described method, could no longer leave the intervention area under their own power unless the hazardous area monitoring apparatus was deactivated.

Further, preferably the intervention area distance is predetermined such that a first communication range, between the hazardous area monitoring apparatus and the first sending and receiving apparatus, and/or a second communication range, between the hazardous area monitoring apparatus and the second sending and receiving apparatus, is greater than the intervention area distance, wherein the first communication range corresponds to a maximum separation at which the first distance is reliably determinable by propagation delay measurement, and the second communication range corresponds to a maximum separation at which the second distance is reliably determinable by propagation delay measurement.

Thus, a distance is greater than the communication range if the determination of this distance fails at least occasionally for the reason that a signal strength of the signal communicated for the propagation delay measurement is no longer strong enough for a reliable propagation delay measurement.

By predetermining an intervention area distance which is less than the first communication range and the second communication range, one ensures that entry by the industrial truck and by the movable object into the intervention area, and also departure from the intervention area, are reliably registered. In addition, one advantageously ensures that the extent of the intervention area is fixedly defined and does not depend on the individual signal strengths of the signals communicated for the propagation delay measurements and/or on the quality of the individual receiving means associated with the sending and receiving apparatuses and/or with the hazardous area monitoring apparatus. This is particularly important if these individual signal strengths and/or the qualities of the individual receiving means change, e.g. due to damage or wear.

According to a preferred embodiment, a monitoring list is stored in a storage medium of the hazardous area monitoring apparatus, wherein a first presence indication entry is entered into the monitoring list if the first distance is less than or equal to a monitoring area distance and the first presence indication entry has not yet been entered into the monitoring list, wherein the first presence indication entry is deleted from the monitoring list if the first distance is greater than the monitoring area distance. In particular the monitoring area distance is greater than the intervention area distance. In particular the monitoring area distance corresponds to a first communication range between the hazardous area monitoring apparatus and the first sending and receiving apparatus. Preferably, a second presence indication entry is entered into the monitoring list if the second distance is less than or equal to the monitoring area distance and the second presence indication entry has not yet been entered into the monitoring list, wherein the second presence indication entry is deleted from the monitoring list if the second distance is greater than the monitoring area distance.

The monitoring area distance is established by a circular monitoring area or spherical intervention area (regarded in three dimensions) which is notionally constructed around the hazardous area monitoring apparatus. If the industrial truck is in the monitoring area, it is entered into the monitoring list. If the industrial truck then leaves the monitoring area, it is deleted from the monitoring list. The analogous actions apply with regard to the movable object. In particular, the intervention area is completely interior to the monitoring area. By employing a display means to display the monitoring list, one can inform the operator of the industrial truck, or another person, of the presence of the industrial truck, and/or of the movable object, in the monitoring area.

Advantageously, a monitoring list containing all of the industrial trucks having sending and receiving apparatuses, and all moving objects having sending and receiving apparatuses, which industrial trucks and moving objects are present in the monitoring area, is stored in the storage medium.

The monitoring area distance preferably corresponds to the communication range, wherein the first presence indication entry and/or the second presence indication entry can be timely entered into the monitoring list before the industrial truck and/or the movable object actually enters/enter into the intervention area.

Preferably, a warning is displayed on a display means of the industrial truck, and/or an acoustic warning is effected on the industrial truck, as long as the first presence indication entry and the second presence indication entry are included in the monitoring list.

Thus, it is possible to the operator of the industrial truck to perceive the presence of the movable object in the monitoring area even if a direct line of sight to the movable object is blocked. If the monitoring area corresponds to the intervention area, the operator of the industrial truck is additionally warned in this manner. If the monitoring area is greater than the intervention area, the operator of the industrial truck can be alerted to a possible collision risk prior to the time that the speed of the industrial truck needs to be limited.

According to an embodiment, different action distances within the monitoring area are specified, in which different messages are provided to an industrial truck and/or a person, when the first distance and the second distance are less than or equal to these action distances. Thus, e.g., when the said distances are less than a first action distance, a warning may be displayed on a display means of the industrial truck. If additionally the said distances are less than a second action distance, additionally an acoustic warning will be effected on the industrial truck. Here, in particular the second action distance is less than the first action distance. Finally, if the said distances are less than the intervention area distance, additionally the industrial truck is caused to be decelerated. The intervention area distance is preferably less than or equal to the second action distance.

Preferably the measurement of the propagation delay of the signal between the hazardous area monitoring apparatus and the first sending and receiving apparatus, and/or the measurement of the propagation delay of the signal between the hazardous area monitoring apparatus and the second sending and receiving apparatus, and/or other signal transmissions between the first sending and receiving apparatus and the hazardous area monitoring apparatus and/or between the second sending and receiving apparatus and the hazardous area monitoring apparatus is/are carried out by means of ultra-wideband technology.

If the described method for collision avoidance is employed as part of a positioning system for position detection, preferably the data communication required for the position detection in the positioning system is carried out by means of ultra-wideband technology, and the signal transmissions for the method of collision avoidance in a hazardous area are carried out by means of a different communications technology, e.g. WLAN or ZigBee.

Further, the object of the invention is achieved by a system for collision avoidance in a hazardous area of a logistics facility, wherein the system is comprised of a stationary hazardous area monitoring apparatus which is disposed within the hazardous area, a first transmitting and receiving apparatus which is disposed on an industrial truck and is connected to a control system of the industrial truck, and a second sending and receiving apparatus which is disposed on a movable object, the system being configured to determine a first distance, between the hazardous area monitoring apparatus and the first sending and receiving device, and a second distance, between the hazardous area monitoring apparatus and the second sending and receiving device, said system being further developed in that the system is configured to determine whether the first distance and the second distance are less than or equal to a predeterminable intervention area distance, wherein the system is further developed in that it is configured to carry out a collision avoidance action when both the first distance and the second distance are less than or equal to the predeterminable intervention area distance.

Preferably the system is configured such that the first distance is determined by measurement of the propagation delay of a signal between the hazardous area monitoring apparatus and the first sending and receiving apparatus, and/or the second distance is determined by measurement of the propagation delay of a signal between the hazardous area monitoring apparatus and the second sending and receiving apparatus.

Further, preferably the system is configured such that, as a collision avoidance action, a speed of the industrial truck is subjected to limitation. Alternatively, a warning at the location of the industrial truck, at the location of the movable object and/or at the location of the hazardous area monitoring apparatus is output as a collision avoidance action, which warning may comprise an optical, acoustic, and/or haptic warning. Alternatively or additionally, a collision avoidance action comprises an intervention in the control system of the industrial truck.

Preferably, the system is configured such that the industrial truck is decelerated to a predeterminable safe speed, if both the first distance and the second distance are less than or equal to the predeterminable intervention area distance, and a speed of the industrial truck is greater than the predeterminable safe speed.

Further, preferably the intervention area distance is predetermined such that a first communication range, between the hazardous area monitoring apparatus and the first sending and receiving apparatus, and/or a second communication range, between the hazardous area monitoring apparatus and the second sending and receiving apparatus, is greater than the intervention area distance, wherein the first communication range corresponds to a maximum separation at which the first distance is reliably determinable by propagation delay measurement, and the second communication range corresponds to a maximum separation at which the second distance is reliably determinable by propagation delay measurement.

Preferably the system is configured such that the measurement of the propagation delay of the signal between the hazardous area monitoring apparatus and the first sending and receiving apparatus, and/or the measurement of the propagation delay of the signal between the hazardous area monitoring apparatus and the second sending and receiving apparatus, and/or other signal transmissions between the first sending and receiving apparatus and the hazardous area monitoring apparatus and/or between the second sending and receiving apparatus and the hazardous area monitoring apparatus is/are carried out by means of ultra-wideband technology.

The system for collision avoidance has the same advantages, features, and characteristics as the above-described method for collision avoidance.

Additional features of the invention will be apparent from the description of embodiments of the invention, along with the claims and the accompanying drawings. Embodiments according to the invention can employ individual features or a combination of a plurality of features.

BRIEF DESCRIPTION OF THE DRAWINGS

The invention will be described below, without limiting the underlying concepts of the invention, via exemplary embodiments with reference to the accompanying drawings, wherein all features and details of the invention which are not specifically described in the text are deemed disclosed by reference to said drawings. In the drawings.

In the drawings, the same or similar elements and/or parts are respectively provided with the same reference numerals, and accordingly the descriptions are not repeated in the text.

DETAILED DESCRIPTION OF THE INVENTION

Figure 1:
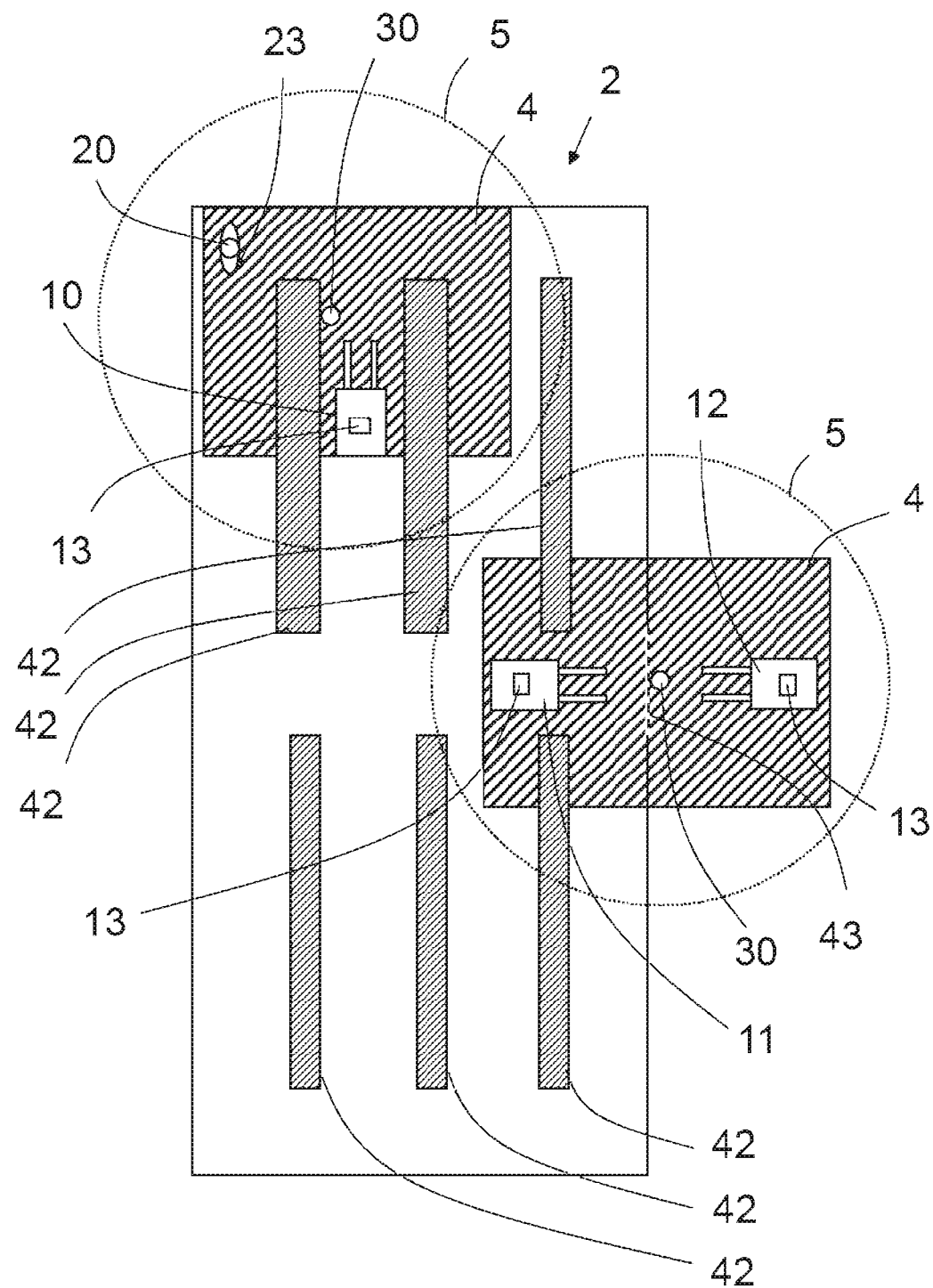
FIG. 1 shows a schematic representation of a logistics facility, with hazardous areas and with hazardous area monitoring apparatuses.

FIG. 1 schematically shows a logistics facility 2, e.g. a warehouse, along with the surrounding industrial premises through which industrial trucks can travel. Within the logistics facility 2, one or more hazardous areas 4 are present in which an increased risk of collision is presented, between industrial trucks 10, 11, 12 and moving objects, e.g. other industrial trucks 10, 11, 12 or persons 20. Such a hazardous area 4 is present, e.g., at the exit of a passageway between a plurality of racks of shelving 42, or at the building exit 43. In FIG. 1, these two hazardous areas 4 are illustrated, for purposes of example, as rectangles containing hatched markings, which comprise the area around an exit passageway between racks 42, and an area around a building exit 43. For the sake of simplicity of representation, other hazardous areas in the logistics facility are not designated, however it is understood that additional hazardous areas may be present in relation to other exit passageways. The rectangular shapes given to the hazardous areas 4 are motivated by graphic efficiency, and they do not necessarily correspond to the actual shapes of a hazardous area 4.

In order to avoid collisions in the hazardous areas 4, hazardous area monitoring apparatuses 30 are disposed in the hazardous areas 4. These are equipped with means for sending and receiving of signals, which means are of types employed in ultra-wideband technology. Further, each industrial truck 10, 11, 12 and each person 20 in the logistics facility is provided with a sending and receiving apparatus 13, 23, which employs means for signal transmission based on ultra-wideband technology, for exchange of signals with the hazardous area monitoring apparatuses 30. Also, in the industrial trucks 10, 11,12 the sending and receiving apparatus 13 is connected to a control system of the said industrial truck 10, 11, 12, and is capable of acting on said control system, e.g. to decelerate said industrial truck 10, 11, 12.

Each of the hazardous area monitoring apparatuses 30 is active over a respective intervention area 5. Based on measurements of propagation delays between the hazardous area monitoring apparatus 30 and the sending and receiving apparatuses 13, 23 it is determined if industrial trucks 10, 11, 12 or persons 20 are present in the intervention areas 5. If both an industrial truck 10, 11, 12 and another moving object, e.g. a second industrial truck 10, 11, 12, or a person 20, are present in the intervention area 5, the industrial truck 10, 11, 12 is decelerated to a safe speed.

In the example illustrated in FIG. 1, a collision between the industrial truck 10 and the person 20 is avoided in this way, and likewise a collision between the industrial trucks 11 and 12 is avoided in this way, because the deceleration of the industrial trucks 10, 11, 12 to a safe speed affords the industrial trucks 10, 11, 12 and the person 20 sufficient time to take measures to avoid a collision, e.g. by taking paths of mutual avoidance.

Figure 2:
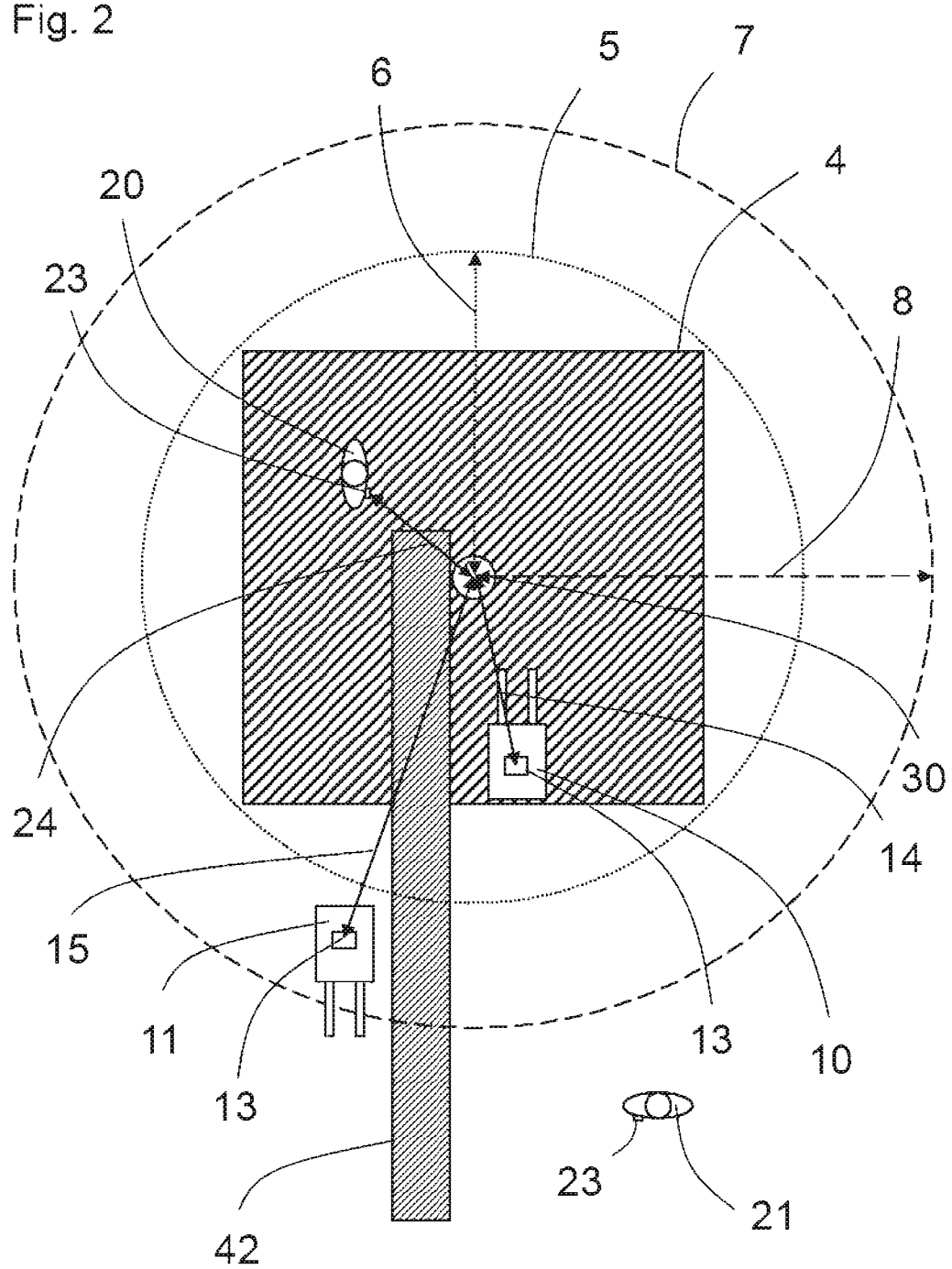
FIG. 2 shows a schematic representation of a hazardous area, an intervention area, and a monitoring area.

An enlarged representation of a hazardous area 4 employing an inventive system for collision avoidance is presented schematically in FIG. 2. A hazardous area 4 in which the risk of a collision is elevated is present in the exit passageway at the rack 42. A hazardous area monitoring apparatus 30 is disposed in the exit passageway of the rack 42, to reduce this risk of a collision. An intervention area 5 extends in a circle around the hazardous area monitoring apparatus 30, having the intervention area distance 6 as a radius, with the hazardous area monitoring apparatus 30 forming the center of the intervention area 5. This intervention area 5 completely encompasses the hazardous area 4.

The industrial truck 10 is disposed inside the intervention area 5. This is determined by determining a first distance 14, by measuring the propagation delay of a signal between the sending and receiving apparatus 13 and the hazardous area monitoring apparatus 30. If this first distance 14 is less than or equal to the intervention area distance 6, then the industrial truck 10 is determined to be present in the intervention area 5. In the same manner, the second distance of the person 20 from the hazardous area monitoring apparatus 30 is determined, and it is established whether the person 20 is present in the intervention area 5. If both the first distance 14 and the second distance 24 are less than or equal to the intervention area distance 6, as is the case in the example illustrated in FIG. 2, then the speed of the industrial truck 10 is reduced, in particular said industrial truck 10 is decelerated to a safe speed.

The distances 14, 24 may be determined at the location of the sending and receiving apparatuses 13, 23 or at the location of the hazardous area monitoring apparatus 30. For example, the first distance 14 and the second distance 24 are determined by transmitting a first signal from the sending and receiving apparatuses 13, 23 to the hazardous area monitoring apparatus 30, and returning a second signal from the hazardous area monitoring apparatus 30 to the sending and receiving apparatuses 13, 23, and measuring the propagation delay as determined at the location of the sending and receiving apparatuses 13, 23. Then the values of the determined distances 14, 24 are sent to the hazardous area monitoring apparatus 30 by signal transmission. Alternatively, the hazardous area monitoring apparatus 30 can directly determine the distances 14, 24, employing signal transmissions in the reverse order.

Likewise, the distances 14, 24 can be compared to the intervention area distance 6 by the hazardous area monitoring apparatus 30 or by the control system of the industrial truck 10. In the latter case, the value of the second distance 24 and possibly also the value of the first distance 14 are previously transmitted from the hazardous area monitoring apparatus 30 to the first sending and receiving device 13.

Then the speed of the industrial truck 10 is reduced either by intervention of the hazardous area monitoring apparatus 30 in the control system of the industrial truck 10 or directly by the control system of the industrial truck 10.

In any event, it is advisable to communicate both the first distance 14 as well as the second distance 24 to the hazardous area monitoring apparatus 30. In this way, the values of these distances 14, 24 will be available at a central location, so that they can be communicated to all industrial trucks 10, 11 and all persons 20 which/who are within the communication range. The described method does not comprise direct signal transmission between the first sending and receiving apparatus 13 and the second sending and receiving apparatus 23.

In addition, in the embodiment illustrated in FIG. 2, the hazardous area monitoring apparatus 30 also defines a circular monitoring area 7 the radius of which corresponds to the monitoring area distance 8, wherein the hazardous area monitoring apparatus 30 forms the center of the monitoring area 7.

In the embodiment illustrated in FIG. 2, the monitoring area distance 8 is greater than the intervention area distance 6, and accordingly the monitoring area 7 is greater than the intervention area 5. All movable objects having a sending and receiving device 13, 23 which objects are present within the monitoring area 7 are entered into a monitoring list, and are deleted from the monitoring list when they leave the monitoring area 7. As an example, this list may be displayed to operators of the industrial trucks 10, 11 in the monitoring area 7 in order to inform them about other industrial trucks 10, 11, or persons 20, which are present in the vicinity of the hazardous area 4. E.g., the operator of an industrial truck 10, 11 may be given an acoustic or visual warning when another movable object is present in the monitoring area 7 in addition to the operator's own industrial truck 10, 11.

The distance 15 of the second industrial truck 11 in FIG. 2 is greater than the intervention area distance 6 but less than the monitoring area distance 8. Thus the industrial truck 11 is located in the monitoring area 7 but not in the intervention area 5, therefore it is entered into the monitoring list but is not decelerated. On the other hand, the person 21 is present outside the monitoring area 7, and thus the person 21 is not included in the monitoring list.

For example, the monitoring area distance 8 may correspond to the communication range between the hazardous area monitoring apparatus 30 and the sending and receiving apparatuses 13, 23, so that the industrial trucks 10, 11 and the persons 20, 21 are timely entered into the monitoring list. The communication range corresponds to a distance which can still be reliably determined by measuring the propagation delay. If a first communication range between the hazardous area monitoring apparatus 30 and the first sending and receiving apparatus 13 of the industrial truck 10 is different from a second communication range between the hazardous area monitoring apparatus 30 and the second sending and receiving apparatus 23 of the person 20, either the smaller of the communication ranges is utilized or else the monitoring area distance 8 for the industrial truck 10 will differ from the monitoring area distance 8 for the person 20.

In contrast, the intervention area distance 6 is intentionally chosen smaller than the communication range or ranges, so that the intervention area distance 6 is not dependent on different communication ranges between the hazardous area monitoring apparatus 30 and the sending and receiving apparatuses 13, 23.

The size and shape of the logistics facility 2, the hazardous areas 4, the hazardous area monitoring apparatus 30, the intervention areas 5, the monitoring areas 7, the industrial trucks 10, 11, 12, and the persons 20, 21, in FIGS. 1 and 2, were selected from the standpoint of good graphic efficiency, and they do not necessarily correspond to the shape and size which said items will have in an implementation or embodiment of the inventive method and/or of the inventive system.

Figure 3A:
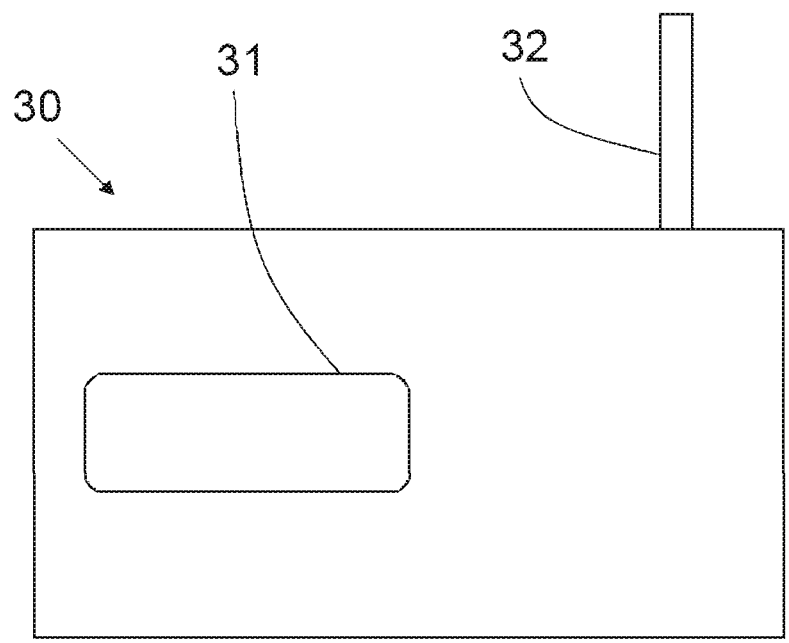
FIG. 3a shows a schematic representation of a hazardous area monitoring apparatus.

FIG. 3a shows a schematic representation of a hazardous area monitoring apparatus 30. This apparatus is comprised of communications means 32, e.g. an antenna, for signal transmissions with the sending and receiving apparatuses 13, 23. For these signal transmissions, preferably ultra-wideband technology is employed. According to an embodiment, the communications means 32 may also be provided for communication with other hazardous area monitoring apparatuses 30 and/or various other apparatuses, e.g. a computer for configuring the collision monitoring system. Additionally, the hazardous area monitoring apparatus 30 is comprised of at least one storage medium 31 on which the monitoring list is stored. Alternatively or additionally, the industrial trucks 10, 11, 12 may be equipped with data processing devices, e.g. computers, which comprise suitable storage media 31 on which the monitoring list is stored.

Figure 3B:
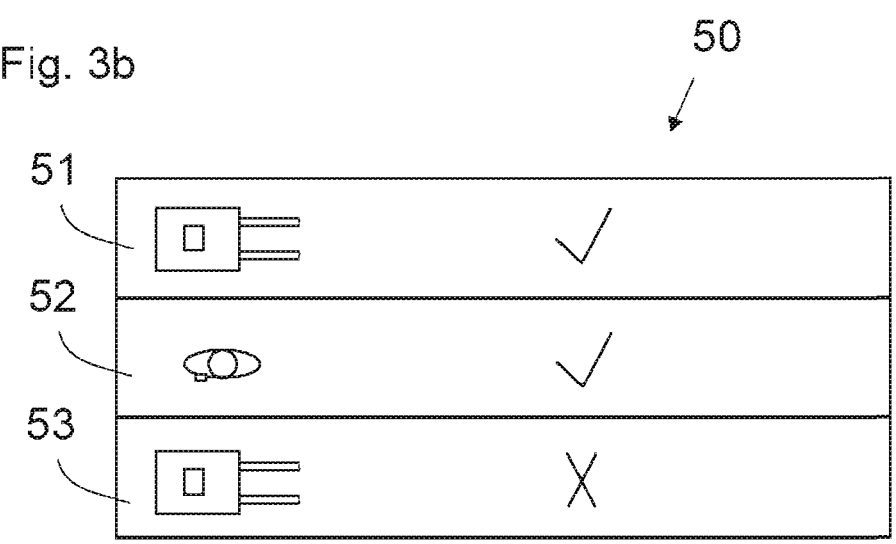
FIG. 3b shows a schematic representation of a monitoring list with presence indication entries.

In FIG. 3b a monitoring list 50 created for the case illustrated in FIG. 2 is shown schematically. All movable objects in the monitoring area 7, thus the industrial trucks 10, 11 and the person 20, are entered into the monitoring list 50. For each of these movable objects, a presence indication entry 51, 52, 53 is created. If a given movable object is also present in the intervention area 5, this is registered in the monitoring list. In FIG. 3, this is indicated by a checkmark. The industrial truck 11 which is located outside the intervention area 5 in FIG. 2 is, in contrast, indicated as being located outside the intervention area, which is marked by means of an "X". Also recorded in the monitoring list is whether it is a presence indication entry 51, 53 for an industrial truck 10, 11 or a presence indication entry 52 for a person. This determination is made, e.g., based on the type of the sending and receiving apparatus 13, 23 used.

If the monitoring list 50 contains at least two presence indication entries 51, 52, which are additionally annotated as being present within the intervention area 5, with at least one of these at least two presence indication entries 51, 52 being associated with an industrial truck 10, then all industrial trucks 10 within the intervention area 5 are decelerated to the safe speed.

If a movable object leaves the monitoring area 7, then the corresponding presence indication entry 51, 52, 53 is deleted from the monitoring list. In FIG. 2 the person 21 is present outside the monitoring area 7, and therefore is not entered into the monitoring list 50.

A display which approximately corresponds to the representation in FIG. 3b can be displayed, e.g., to an operator of an industrial truck in the monitoring area 7 so that he/she is informed about other movable objects in the vicinity of the hazardous area 4.

All features described, and all features disclosed via the drawings alone, and in addition individual features which are disclosed in combination with other features, are deemed, individually and in combination, to be essential to the invention. Embodiments according to the invention can be comprised of individual features or a combination of a plurality of features. Within the scope of the invention, features which are described with the terms "particularly", "in particular", or "preferably", should be understood to be optional features.

LIST OF REFERENCE NUMERALS

2 Goods logistics facility
4 Hazardous area
5 Intervention area
6 Intervention area distance
7 Monitoring area
8 Monitoring area distance
10, 11, 12 Industrial truck
13 First sending and receiving apparatus
14, 15 Distance
20, 21 Person
23 Second sending and receiving apparatus
24 Distance
30 Hazardous area monitoring apparatus
31 Storage medium
32 Means of communication
42 Rack
43 Building exit
50 Monitoring list
51 First presence indication entry
52 Second presence indication entry
53 Third presence indication entry

What is claimed is:

1. A method for collision avoidance in a hazardous area of a logistics facility, the method comprising:
   determining a first distance between a stationary hazardous area monitoring apparatus, which is disposed within the hazardous area, and a first sending and receiving apparatus which is disposed on an industrial truck and is connected to a control system of the industrial truck,
   determining a second distance between the hazardous area monitoring apparatus and a second sending and receiving apparatus which is disposed on a movable object,
   determining whether the first distance and the second distance are less than or equal to a predeterminable intervention area distance, and
   carrying out a collision avoidance action when it is determined that both the first distance and the second distance are less than or equal to the predeterminable intervention area distance,
   wherein the predeterminable intervention area distance notionally establishes a circular or spherical intervention area around the hazardous area monitoring apparatus, and
   wherein the hazardous area is located completely inside the intervention area or substantially corresponds to the intervention area.

2. The method according to claim 1, wherein the first distance is determined by measuring a propagation delay of a signal between the hazardous area monitoring apparatus and the first sending and receiving apparatus, and/or the second distance is determined by measuring a propagation delay of a signal between the hazardous area monitoring apparatus and the second sending and receiving apparatus.

3. The method according to claim 2, wherein the measurement of the propagation delay of the signal between the hazardous area monitoring apparatus and the first sending and receiving apparatus and/or the measurement of the propagation delay of the signal between the hazardous area monitoring apparatus and the second sending and receiving apparatus and/or other signal transmissions between the first sending and receiving apparatus and the hazardous area monitoring apparatus and/or between the second sending and receiving apparatus and the hazardous area monitoring apparatus is/are carried out using ultra-wideband technology.

4. The method according to claim 1, wherein the collision avoidance action that is carried out is limitation of a speed of the industrial truck.

5. The method according to claim 1, wherein the industrial truck is decelerated to a predeterminable safe speed when both the first distance and the second distance are determined to be less than or equal to the predeterminable intervention area distance and a speed of the industrial truck is greater than the predeterminable safe speed.

6. The method according to claim 1, wherein the intervention area distance is predetermined such that a first communication range between the hazardous area monitoring apparatus and the first sending and receiving apparatus and/or a second communication range between the hazardous area monitoring apparatus and the second sending and receiving apparatus is greater than the intervention area distance, and wherein the first communication range corresponds to a maximum separation at which the first distance is reliably determinable by a propagation delay measurement and the second communication range corresponds to a maximum separation at which the second distance is reliably determinable by a propagation delay measurement.

7. The method according to claim 1, wherein a monitoring list is stored in a storage medium of the hazardous area monitoring apparatus, wherein a first presence indication entry is entered into the monitoring list when the first distance is determined to be less than or equal to a monitoring area distance and the first presence indication entry has not yet been entered into the monitoring list, wherein the first presence indication entry is deleted from the monitoring list when the first distance is determined to be greater than the monitoring area distance.

8. The method according to claim 7, wherein a second presence indication entry is entered into the monitoring list when the second distance is determined to be less than or equal to the monitoring area distance and the second presence indication entry has not yet been entered into the monitoring list, and wherein the second presence indication entry is deleted from the monitoring list when it is determined that the second distance is greater than the monitoring area distance.

9. The method according to claim 8, wherein a warning is displayed on a display of the industrial truck and/or an acoustic warning is effected on the industrial truck when the first presence indication entry and the second presence indication entry are included in the monitoring list.

10. A system for collision avoidance in a hazardous area of a logistics facility, the system comprising:
a stationary hazardous area monitoring apparatus which is disposed within the hazardous area,
a first sending and receiving apparatus, which is disposed on an industrial truck and is connected to a control system of the industrial truck, and
a second sending and receiving apparatus, which is disposed on a movable object,
wherein the system is configured to determine a first distance between the hazardous area monitoring apparatus and the first sending and receiving apparatus and a second distance between the hazardous area monitoring apparatus and the second sending and receiving apparatus,
wherein the system is configured to determine whether the first distance and the second distance are less than or equal to a predeterminable intervention area distance,
wherein the predeterminable intervention area distance notionally establishes a circular or spherical intervention area around the hazardous area monitoring apparatus, and
wherein the hazardous area is located completely inside the intervention area or substantially corresponds to the intervention area, and
wherein the system is further configured to carry out a collision avoidance action when both the first distance and the second distance are determined to be less than or equal to the predeterminable intervention area distance.

11. The system according to claim 10, wherein the system is configured to determine the first distance by measuring a propagation delay of a signal between the hazardous area monitoring apparatus and the first sending and receiving apparatus and/or the system is configured to determine the second distance by measuring a propagation delay of a signal between the hazardous area monitoring apparatus and the second sending and receiving apparatus.

12. The system according to claim 11, wherein the system is configured such that measurement of the propagation delay of the signal between the hazardous area monitoring apparatus and the first sending and receiving apparatus and/or measurement of the propagation delay of the signal between the hazardous area monitoring apparatus and the second sending and receiving apparatus and/or other signal transmissions between the first sending and receiving apparatus and the hazardous area monitoring apparatus and/or between the second sending and receiving apparatus and the hazardous area monitoring apparatus is/are carried out using ultra-wideband technology.

13. The system according to claim 10, wherein the system is configured such that, as the collision avoidance action, a speed of the industrial truck is limited.

14. The system according to claim 10, wherein the system is configured such that the industrial truck is decelerated to a predeterminable safe speed when it is determined that both the first distance and the second distance are less than or equal to the predeterminable intervention area distance and a speed of the industrial truck is greater than the predeterminable safe speed.

15. The system according to claim 10, wherein the intervention area distance is predetermined such that a first communication range between the hazardous area monitoring apparatus and the first sending and receiving apparatus and/or a second communication range between the hazardous area monitoring apparatus and the second sending and receiving apparatus is greater than the intervention area distance, wherein the first communication range corresponds to a maximum separation at which the first distance is reliably determinable by a propagation delay measurement, and wherein the second communication range corresponds to a maximum separation at which the second distance is reliably determinable by a propagation delay measurement.

* * * * *